(12) United States Patent
Shpigel et al.

(10) Patent No.: US 8,375,033 B2
(45) Date of Patent: Feb. 12, 2013

(54) INFORMATION RETRIEVAL THROUGH IDENTIFICATION OF PROMINENT NOTIONS

(76) Inventors: Avraham Shpigel, Haifa (IL); Shalom Wintner, Haifa (IL)

( * ) Notice: Subject to any disclaimer, the term of this patent is extended or adjusted under 35 U.S.C. 154(b) by 552 days.

(21) Appl. No.: 12/588,505

(22) Filed: Oct. 19, 2009

(65) Prior Publication Data

US 2011/0093257 A1  Apr. 21, 2011

(51) Int. Cl.
*G06F 17/30* (2006.01)

(52) U.S. Cl. .............................. 707/748; 707/707; 704/9

(58) Field of Classification Search ................ 707/706, 707/736, 748, 770; 704/9
See application file for complete search history.

(56) References Cited

U.S. PATENT DOCUMENTS

| | | | |
|---|---|---|---|
| 5,642,520 A * | 6/1997 | Takeshita et al. ................ 704/3 |
| 6,212,494 B1 * | 4/2001 | Boguraev ......................... 704/9 |
| 7,251,781 B2 * | 7/2007 | Batchilo et al. ............... 715/210 |
| 7,313,523 B1 * | 12/2007 | Bellegarda et al. ........... 704/268 |
| 7,383,172 B1 * | 6/2008 | Jamieson ........................... 704/9 |
| 7,752,033 B2 * | 7/2010 | Uchimoto et al. ................. 704/9 |
| 7,877,343 B2 * | 1/2011 | Cafarella et al. ................ 706/20 |
| 2005/0182629 A1 * | 8/2005 | Coorman et al. ............. 704/266 |
| 2006/0142994 A1 * | 6/2006 | Zhou ................................. 704/9 |
| 2006/0155528 A1 * | 7/2006 | Higgins ............................. 704/3 |
| 2006/0184353 A1 * | 8/2006 | Weise ................................ 704/4 |
| 2006/0224580 A1 * | 10/2006 | Quiroga et al. .................... 707/5 |
| 2007/0185860 A1 * | 8/2007 | Lissack ............................. 707/5 |
| 2007/0219776 A1 * | 9/2007 | Gamon et al. .................... 704/9 |
| 2008/0133488 A1 * | 6/2008 | Bandaru et al. ................... 707/3 |
| 2010/0063799 A1 * | 3/2010 | Jamieson .......................... 704/9 |
| 2010/0174526 A1 * | 7/2010 | Zhang ............................... 704/9 |
| 2010/0223257 A1 * | 9/2010 | Milic-Frayling et al. ...... 707/722 |
| 2011/0191276 A1 * | 8/2011 | Cafarella et al. ................ 706/12 |

* cited by examiner

*Primary Examiner* — Debbie Le

(57) ABSTRACT

A system and method for information retrieval from a corpus of text based on offline prominent sentences extraction, and online prominent sentences retrieval ordered by predefined criteria, and recommending online cross-interest prominent sentences.

17 Claims, 5 Drawing Sheets

INFORMATION RETRIEVAL THROUGH IDENTIFICATION OF PROMINENT NOTIONS

FIELD OF THE INVENTION

The present invention relates generally to information retrieval and information extraction through natural language analysis of texts, and more specifically to production of more relevant search results by utilizing natural language processing technology, and more specifically to identification of prominent notions in texts by analysis of sentence structure, identification of noun phrases (NPs), identification of verb phrases, identification of rules and criteria for defining prominent notions based on sentence structure, NP repetitions in document, corpus statistics and usage statistics, and recommending prominent sentences based on all the above.

SUMMARY OF THE INVENTION

It is an object of some aspects of the present invention to provide systems and methods which identify prominent notions in texts based on natural language technology, including (but not limited to) analysis of sentence structure, identification of noun phrases and verb phrases and collection of statistics pertaining to their use. Common patterns of verb phrase usage are extracted automatically, verified statistically, and are associated with a specific corpus, yielding a footprint of phrasing style.

It is also an object of some aspects of the present invention to provide systems and methods which search and retrieve prominent sentences in texts, by matching search keywords provided by a user and criteria based on natural language analysis of said texts, utilizing patterns and statistics collected off-line, thereby producing more relevant search results.

It is also an object of some aspects of the present invention to provide systems and methods which collect statistics about users' interest in prominent sentences in order to recommend prominent sentences to other users.

The present invention will be more fully understood from the following detailed description of the preferred embodiments thereof, taken together with the drawings.

According to some embodiments of the present invention, information retrieval includes the steps of:
 a. extracting offline prominent sentences from a corpus of text;
 b. retrieving online prominent sentences ordered by criteria;
 c. recommending online cross-interest prominent sentences.

Yet further, according to some embodiments of the present invention, extracting offline prominent sentences further includes the step of scoring prominent sentences according to at least one of the following parameters; sentence structure, extracted rule, frequency of NP subject, frequency of NP subject head, and combination thereof.

Yet further, according to some embodiments of the present invention, sentence structure includes from left to right: NP subject, verb pattern, text following said verb pattern, dot.

Yet further, according to some embodiments of the present invention, extracted rule further includes the step of:
 a. extracting said sentence structure;
 b. extracting verb pattern from sentence;
 c. scoring the sentence and its verb pattern;
 d. summing the score of the verb pattern over all the occurrences of the pattern in the corpus;
 e. Verb pattern is referred to as rule if its score is greater than a pre-defined threshold.

Yet further, according to some embodiments of the present invention, scoring sentence further includes the summing of the scores of at least one of the following parameters: number of occurrences of the NP subject in the same document both before and after the occurrence of the pattern, number of occurrences of the NP subject head of the subject in the same document both before and after the occurrence of the pattern, length in words of the NP subject, length in words of the verb cluster, length in words of the sentence, sentence tense, sentence aspect, sentence mood, sentence voice of the verbs in the pattern, subject is available in an existing library of concepts, NP subject head is available in an existing library of concepts, and combined thereof.

Yet further, according to some embodiments of the present invention, verb pattern includes at least one of: verb cluster, the determination word of the object followed the verb cluster, punctuation, and combined thereof.

Yet further, according to some embodiments of the present invention, retrieving online prominent sentences ordered by criteria further includes at least one of: Search keywords cited in document, Document type, Number of search keywords cited in a single prominent sentence, Search keywords cited in the Subject part of the prominent sentence, Formal definition, Number of words in Subject, Number of words in prominent sentence, The score of the prominent sentence, Document creation date, Frequency of interest in prominent sentence, Morphological information, Part of speech of a search keyword in prominent sentence, The ratio of all prominent sentences in document to the document length, Document text quality, Document size (in words) and combined thereof.

Yet further, according to some embodiments of the present invention, recommending cross-interest prominent sentences further includes the step of
 a. user interested in at least two prominent sentences on the same session;
 b. updating the statistic of cross-interested prominent sentences;
 c. recommend at least one cross-interest prominent sentence to at least one user.

Yet further, according to some embodiments of the present invention, corpus of text further includes at least one of: any single document, any collection of documents, organizational project documents, organizational documents, any vertical corpus of text, corpora, and combined thereof.

Yet further, according to some embodiments of the present invention, a computer software product for searching and retrieving prominent sentences, includes a computer-readable medium in which program instructions are stored, which instructions, when read by a computer, cause the computer to:
 a. extracting offline prominent sentences from a corpus of text;
 b. retrieving online prominent sentences ordered by criteria;
 c. recommending online cross-interest prominent sentences.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a simplified drawing of the system overview;

FIG. 2 is a simplified flow chart illustrating how to exploit cross-interest in prominent sentences;

FIG. 3 is a simplified flow chart illustrating the method of rule extraction offline;

FIG. 4 is a simplified flow chart illustrating the method of prominent sentence extraction offline; and FIG. 5 is a simplified flow chart illustrating the retrieval of ranked prominent sentences online.

DETAILED DESCRIPTION OF PREFERRED EMBODIMENTS

Introduction

Prominent notions in text are often expressed as noun phrases (NPs) that tend to be repeated several times in the same document, either verbatim or with linguistic and stylistic variations. Frequently, such notions are introduced in special syntactic constructions, typically involving special patterns of verb phrases (VPs). Identifying prominent notions in texts can greatly improve the quality of information retrieval: when a user provides search keywords, existing search engines retrieve documents based on 'simple' matching of the keyword to the plain text of the document. This invention proposes to augment this process and improve its quality by utilizing natural language technology to identify prominent notions, based on the syntactic contexts in which they tend to occur, and by matching such notions (and their contexts) against the user's query. Notions and their prominence will be determined using statistics collected from a large body of texts (a corpus) in a manner that will be outlined below.

The present invention describes systems, methods and software for automatic identification of prominent notions in a corpus of text, utilizing natural language analysis of the text, identification of basic sentence structure, including noun phrases and verb phrases, identification of syntactic constructions that are common in the context of prominent notions and collection of statistics pertaining to the usage of such syntactic elements. This information is collected off-line from a large corpus of texts and is stored in a database. At run time, users may search the corpus for relevant content by providing search keywords. The present invention describes systems, methods and software that use the said database, along with predefined criteria, to prioritize the retrieved prominent sentences along with the documents in which they occur based on the user's query. The present invention also describes systems, methods and software that utilize the said database in a recommendation system.

Figure 1:
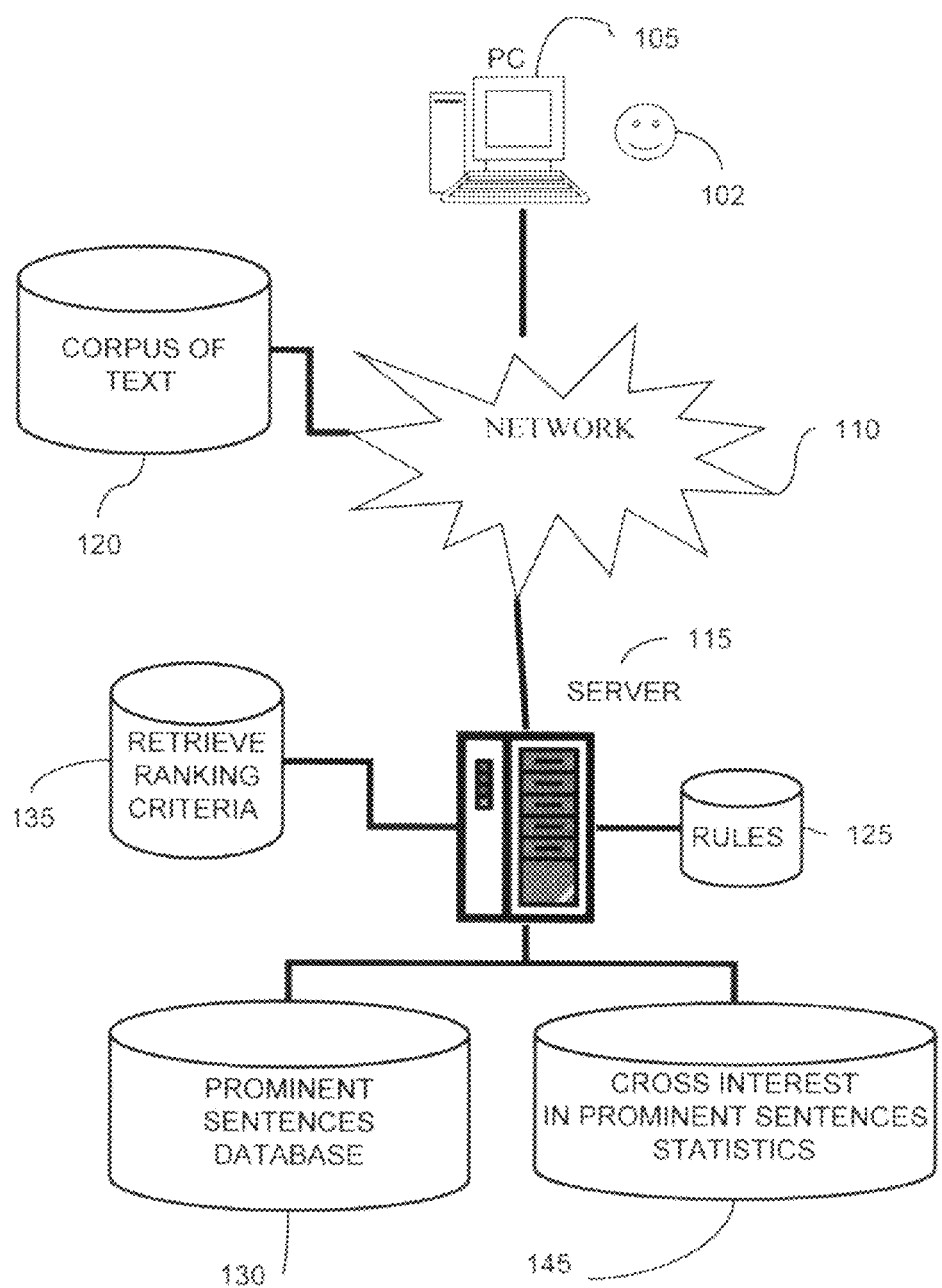

System Overview:

Reference is now made to the proposed system depicted in FIG. 1. In offline mode, a corpus of text documents 120 is processed by a server 115 having software to identify prominent sentences 130 containing prominent notions, based on natural language processing analysis that identifies sentence structure, NPs, and certain patterns of VPs 125 approved statistically. Users 102 interact with the system via a PC 105 and the network 110 to search and retrieve relevant documents by matching the input keywords with prominent sentences 130 in online mode. The retrieved prominent sentences 130 in the documents 120 are prioritized by predefined ranking criteria 135. The system may collect statistics of prominent sentence cross interest 145 that can be used to recommend prominent sentences to other users 102.

Linguistic Pre-Processing Based on Prior Art:

Reference is now made to the linguistic pre-processing of the corpora, performed off-line. Prior art natural language processing technology is used in this stage. Given a corpus of documents, each document is first tokenized, and sentence boundary is detected automatically. Then, for each sentence in each document, the part-of-speech category of each token is determined automatically. Then, for each sentence, basic syntactic structures are identified automatically, including (but not limited to) the subject, the main verb (or verb cluster), all noun phrases and prepositional phrases, heads of noun phrases, etc. The head of a noun phrase is a noun or a sequence of nouns that convey the main meaning of the noun phrase, excluding adjuncts and modifiers such as adjectives, determiners, relative clauses etc. For example, the head of the NP "the 1918 flu pandemic" is "pandemic" or "flu pandemic".

As an example of linguistic pre-processing, consider the following sentence:

"Swine influenza was first proposed to be a disease related to human influenza during the 1918 flu pandemic."

Part-of-speech tagging may result in:

(NNP Swine) (NN influenza) (VBD was) (RB first) (VBD proposed) (TO to) (VB be) (DT a) (NN disease) (VBD related) (TO to) (JJ human) (NN influenza) (IN during) (DT the) (CD 1918) (NN flu) (NN pandemic)

Shallow syntactic parsing may result in:

(NP-SUBJ Swine influenza) (VP was first proposed to be) (NP-OBJ a disease) (VP related) (PP to) (NP human influenza) (PP during) (NP the 1918 flu pandemic)

Special attention is given to sentences whose syntactic structure is likely to indicate the presence of prominent notions. Such sentences are used to extract patterns, which are sequences of linguistic units. Syntactic structures used to extract patterns include, but are not limited to, sentences consisting of a subject at the beginning of the sentence, followed by a sequence of verbs, followed by either an object noun phrases or an object prepositional phrase, ending in a dot. Adverbials and other prepositional phrases can optionally precede or succeed the subject. Given such a syntactic structure, the pattern extracted consists of the verb sequence, followed by the preposition of the object (if such exists).

EXAMPLE 1

[SUBJ Swine influenza] [VERB-CLUSTER was first proposed to be] [NP-OBJ a disease] related to human influenza during the 1918 flu pandemic.

Pattern extracted: SUBJ was first proposed to be NP

EXAMPLE 2

[SUBJ The H1N1 form of swine flu] [VERB-CLUSTER is] [NP-OBJ one of the descendants of the strain that caused the 1918 flu pandemic].

Pattern extracted: SUBJ is NP

EXAMPLE 3

[SUBJ The 1918 flu pandemic in humans] [VERB-CLUSTER was associated] [PP-OBJ with H1N1 and influenza appearing in pigs].

Pattern extracted: SUBJ was associated with NP

EXAMPLE 4

[PP-ADVERBIAL In 1998,] [SUBJ swine flu] [VERB-CLUSTER was found] [PP-OBJ in pigs] in four U.S. states.

Pattern extracted: SUBJ was found in NP

Figure 3:
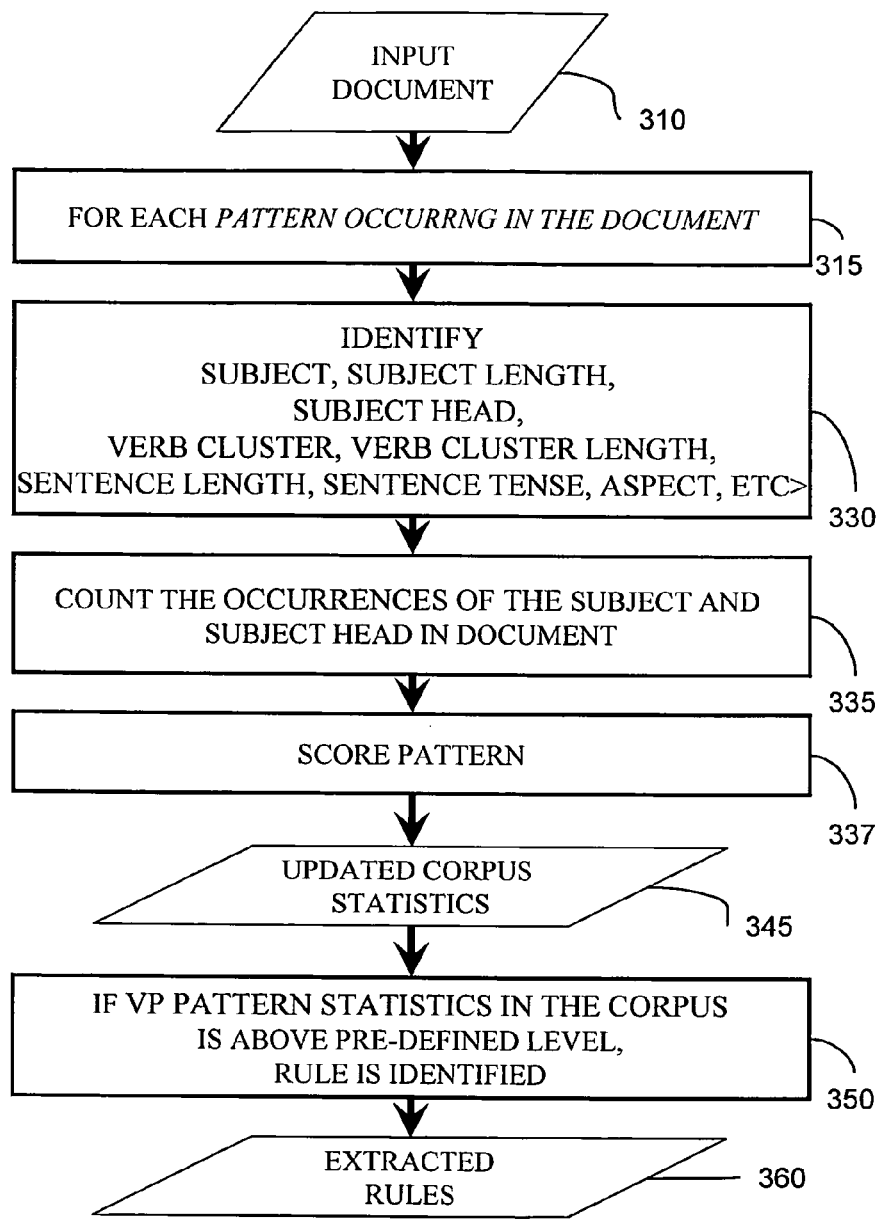

Offline Rule Extraction:

Reference is now made to the process of extracting rules from the corpus, depicted in FIG. 3, based on the patterns identified above. Each occurrence of the pattern 315 is scored 337 using a function of the following parameters 330:

1. The number of occurrences of the specific subject in the same document, both before and after the occurrence of the pattern 335. The more frequent the subject, the more likely is the pattern useful for identifying the context of prominent notions. Note: naturally, a prominent notion is introduced first and is elaborated on later, but this is not a strict order.
2. Same, but taking into account only the head of the subject NP 335. Note:

the longer the subject NP is, the less likely it is to be repeated verbatim. Therefore, the number of occurrences of similar NPs sharing the same head in the document is very valuable.

3. The length (in words) of the subject.
4. The length (in words) of the verb cluster.
5. The length (in words) of the sentence.
6. The tense, aspect, mood and voice of the verbs in the pattern. Some forms (e.g., present tense, passive voice) are more indicative of prominent notions than others (e.g., future tense, imperative).
7. Whether or not the subject is available in an existing library of concepts.
8. Same, but taking into account only the head of the subject NP.

The combined score of the pattern 337 is a function of the above parameters, summed over all the occurrences of the pattern in the corpus 350. Patterns 345 whose score is greater than a pre-defined threshold 350 are referred to as rules 360.

Note: Rules can be further pruned by applying filters to remove common patterns that are unlikely to be indicative of prominent notions. For example, NP subjects consisting of common pronouns (e.g., "it") or person names (e.g., "John") may have high frequency for are less useful for identifying prominent notions. Such cases will be filtered out.

Conversely, the rules may be enhanced by less frequent but highly indicative types of subject NPs. Examples include, but are not limited to, acronyms (e.g., H1N1), quoted NPs (e.g., "Swine Flu"), highlighted NPs (e.g., boldface or italics terms), etc.

It is clear to any person skilled in this art that a subset of the parameters or different weights for each parameter or parameters tailored to a specific corpus or application can be used. It is also clear that length can be measured in various ways (e.g. linear {1, 2, 3 . . . }, or by ranges {1, 2-7, 8 and up}, etc.)

Figure 4:
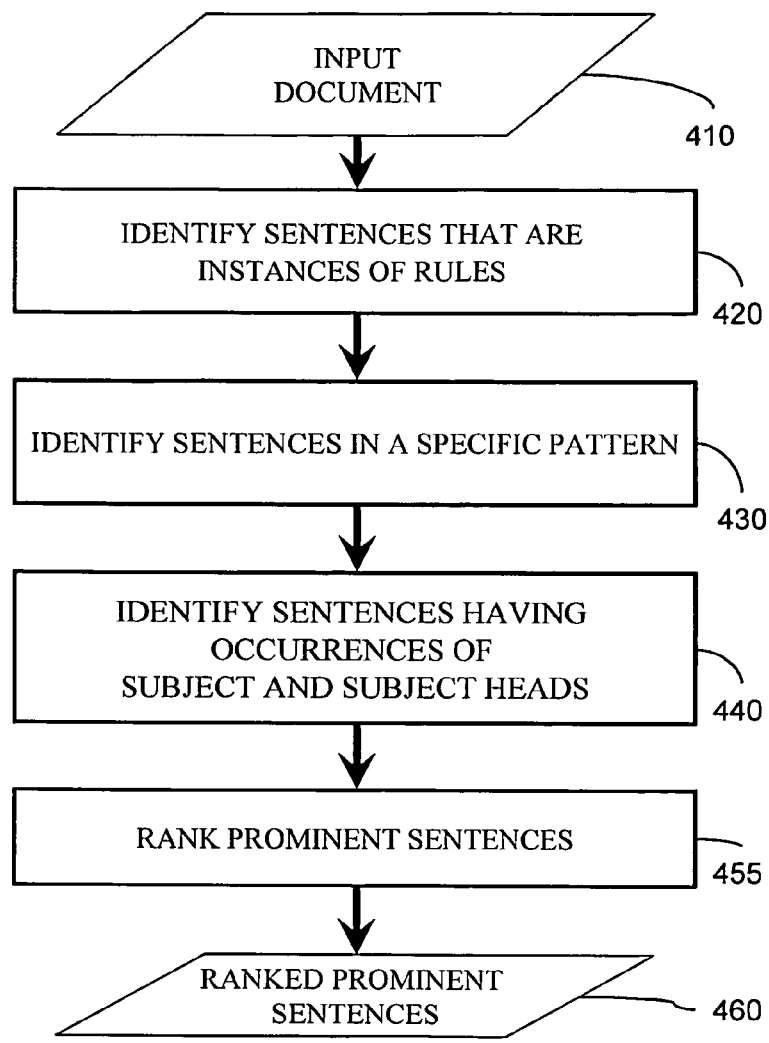

Offline Extraction of Prominent Sentence:

Reference is now made to FIG. 4, the identification of prominent sentences performed off-line after the linguistic pre-processing of the corpus and after the above-mentioned rule extraction. Note: in this stage the extracted prominent sentences may include sentences whose structure is different from the one used for rule extraction. For each input document 410 taken from the corpus 120, and for each sentence in the document, assign a score to the sentence 455 as a function of the following parameters:

P1. Compliance with rules 420. If the sentence can be construed as an instance of a rule, as defined above, its score will be higher. The score of the rule will be used in computing the score of the sentence.

P2. Frequency of noun phrases 440. For each NP in the sentence, count the number of occurrences of the NP before and after the sentence in the given document. The higher the frequency, the higher the score this sentence will be assigned.

P3. Same, but counting heads of NPs rather than full NPs 440.

P4. Syntactic structure 430. Whether or not the sentence complies with the general sentence structure defined above.

For example, sentences that comply with a rule whose score is high (P1), with a high-frequency NP as their subject (P2, P3), and comply with the sentence structure (P4) are likely to score higher than other sentences.

Offline—Prepared Database Content:

Each prominent sentence is then stored in a database 130, along with the following data.

Common information for all the prominent sentences in each document:

1. Document type (e.g., PDF)
2. Document topic (if known)
3. Document origin (e.g., URL)
4. The number of prominent sentences in the document
5. Document size
6. Document quality (if known)
7. Document creation date (if known)

Specific information for each extracted prominent sentence:

1. An indication that the prominent sentence is a formal definition (if exists). For example, a document may have a paragraph called 'definitions'. In this case, each definition is a prominent sentence.
2. Prominent sentence score (as defined above)
3. Subject, subject head and their length (in words)
4. Sentence length (in words) 208
5. VP pattern score (as defined above)
6. Part of speech of each word in the sentence
7. A link to the occurrence of the sentence in the corpus
8. Optional: the database may store chunks of text longer than a single sentence (e.g., a paragraph comprising a prominent sentence with other non-prominent sentences).

Raw Data:

In addition, the database stores also the raw data of the original corpus (including the text of non-prominent sentences). This text will be used to provide results that will be presented after the prominent results, as a default mechanism.

Offline Detection of Phrasing Style:

The phrasing style is interpreted in this invention as a set of rules that are more frequent in a specific domain, genre or corpus. It is clear that rules that were extracted from a specific corpus are the phrasing style of this corpus.

The phrasing style can be specific to a single document, or to a project (documents relating to an organizational project), or to an organization (all documents of an organization), or to a corpus, or in general to any text content.

It is clear to any person skilled in this art that rules can be extracted from one corpus and used elsewhere in other corpora or text content. In this case it is assumed that the performance of the system will degrade.

Example application: any rule extracted from a document will receive higher priority in this document over other possible rules.

Figure 5:
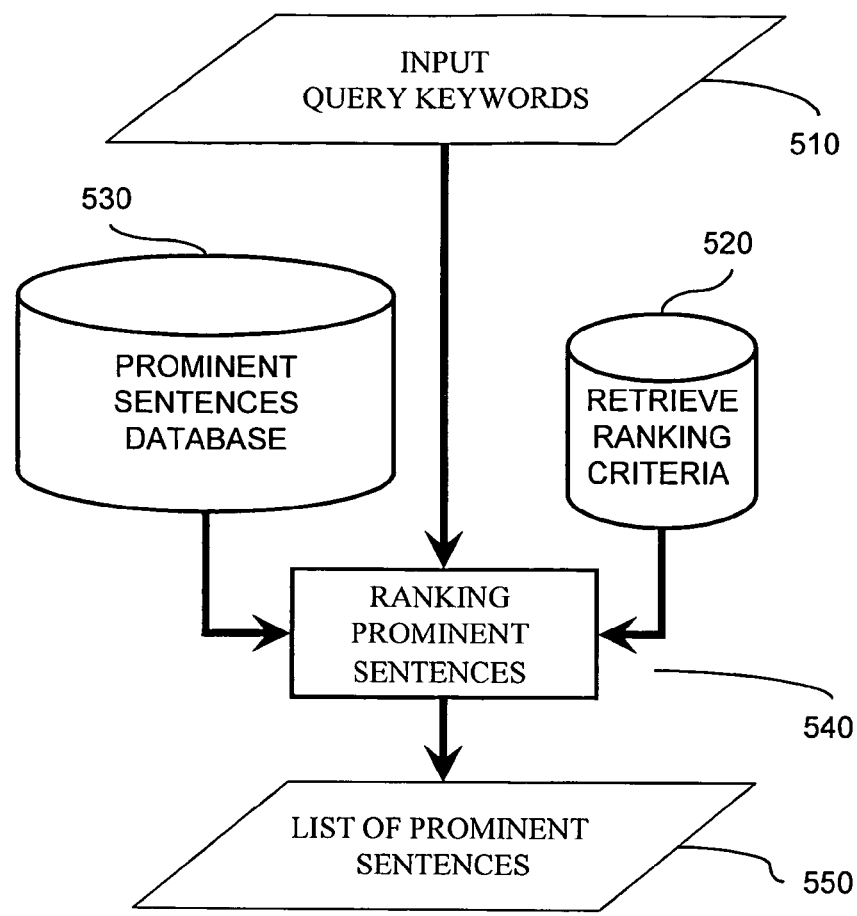

Online Search:

Reference is now made to the identification and ranking of retrieved prominent sentences as depicted in FIG. 5. User-provided keywords 510 are used to retrieve prominent sentences 540 ordered by ranking criteria (Table 1) 520 from the database of prominent sentences and additional content (e.g., document URL and topic) prepared off-line 530. The retrieved list of prominent sentences, along with additional information, (such as the document title and URL) is presented to the user 550.

Each ranking criterion in Table 1 has a weight, a score and a default value. Each retrieved sentence is evaluated against the criteria: its compliance with the criteria is assigned a score, and this score is then multiplied by the weight of the criterion. The total score of a sentence is the sum of all the weighted scores of this sentence for all criteria. Note: assigning partial scores to sentences can be done offline (excluding criteria which depend on the input keywords).

TABLE 1 retrieve ranking criteria

| Criterion | Proposal for default value | Description/Notes |
|---|---|---|
| Search keywords cited in document | All search keywords must be cited in the document | User keywords can be cited anywhere in the document. The residual user keywords that were not cited in prominent sentences must be cited elsewhere in the document. |
| Document type | Structured text formats, such as PDF and DOC, score highest | |
| Number of search keywords cited in a single prominent sentence | The greater the number of keywords in a sentence, the higher the score | |
| Search keywords cited in the Subject part of the prominent sentence | Keywords cited in the Subject of prominent sentences yield higher score than keywords cited in the rest of the same sentence | |
| Formal definition | Formal definitions are ranked above any other prominent sentences | Document may contain a paragraph called 'Definitions'. |
| Number of words in Subject | Longer subjects score higher | It is assumed that short subjects are more general while longer subjects are more local and user specific. |
| Number of words in prominent sentence The score of the prominent sentence | Longer sentences score higher | This criterion may be used to filter out very short sentences |
| Document creation date | Newer documents score higher | |
| Frequency of interest in prominent sentence | More frequently-accessed sentences score higher | Interest in prominent sentences can measured as the frequency with which a user activates the prominent sentence link to obtain further information. |
| Morphological information | Original keywords yield higher scores than their morphological variants | E.g., singular vs. plural. |
| Part of speech of a search keyword in prominent sentence | Nouns and proper names score higher than other POS categories | The role of the user keyword in the prominent sentence. |

TABLE 1-continued retrieve ranking criteria

| Criterion | Proposal for default value | Description/Notes |
|---|---|---|
| The ratio of all prominent sentences in document to the document length | Higher ratio of prominent sentences in a document scores higher | More prominent sentences relative to the document size may indicate the importance of prominent sentences to the author. |
| Document text quality | Higher quality documents are ranked higher that lower quality ones | Based on prior art software that can measure the quality of document. |
| Document size (in words) | Longer documents score higher | Longer documents tend to be more informative. |

A retrieved prominent sentence may contain all the search keywords or some search keywords or keywords only in the Subject or keywords only in the NP or PP following the verb cluster or in both. All keywords may be cited in the document but not necessarily in the prominent sentences.

Figure 2:
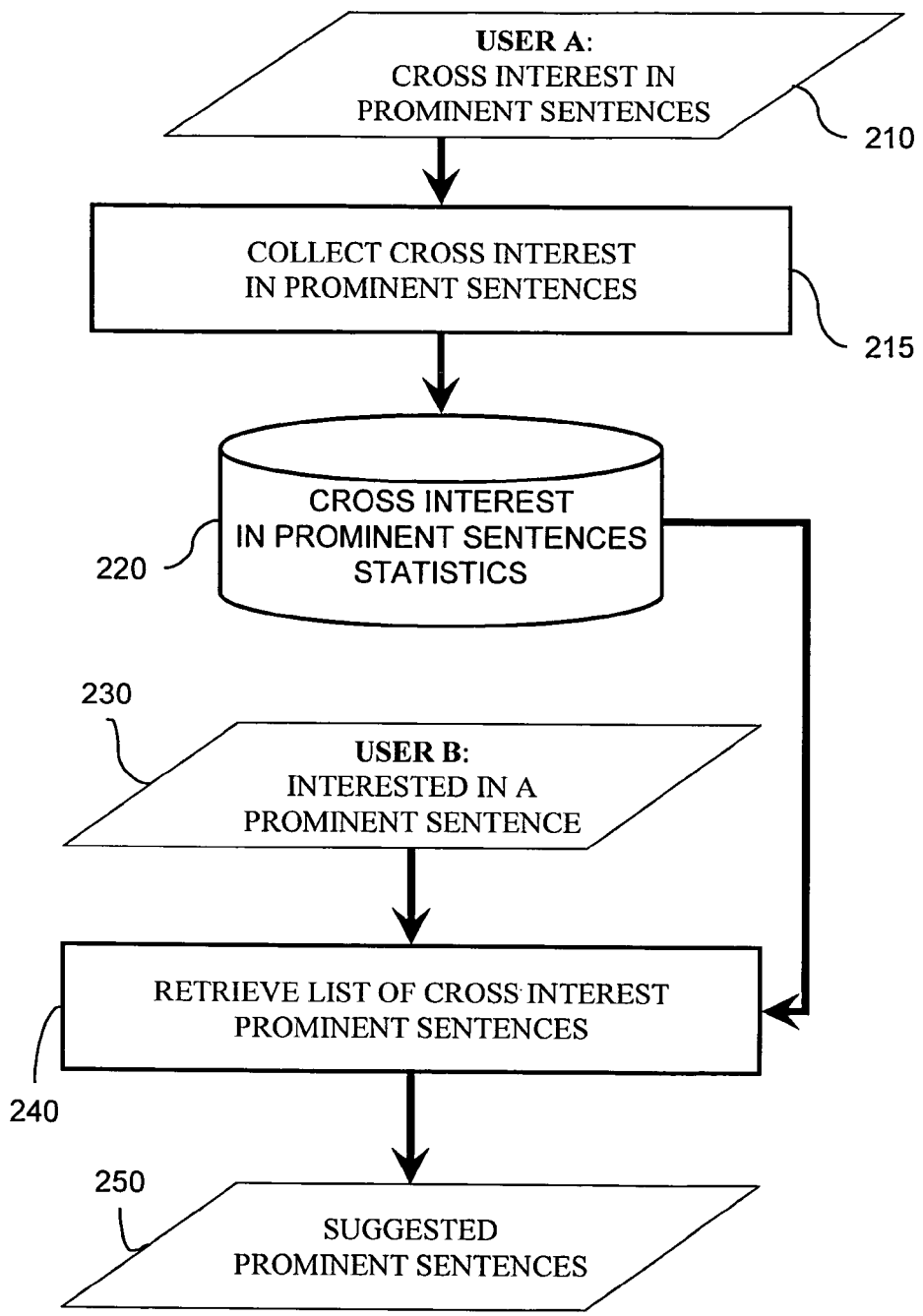

Improving Search Results by Utilizing Information Showing Interest in Multiple Sentences:

Reference is now made to the exploiting of the interest in prominent sentences as depicted in FIG. 2. A user may conduct a search session consisting of several queries. During the search session the user may have an interest in two or more prominent sentences, where interest is expressed as activating the link provided with the search result to obtain more information 210. Statistics of users expressing interested in multiple prominent sentences are collected 215 and saved 220.

Information collected on users' interest in multiple sentences 215 is used to recommend possible prominent sentences 240 to other users, based on their interest in a specific prominent sentence 230. Example: if during a search session a user expresses interest in a specific prominent sentence, then a popup window is opened showing a list of prominent sentences, based on the statistics of cross interest in prominent sentences.

Patent Issues:

The references cited herein teach many principles that are applicable to the present invention. Therefore the full contents of these publications are incorporated by reference herein where appropriate for teachings of additional or alternative details, features and/or technical background.

It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

While the above example contains some rules, these should not be construed as limitations on the scope of the invention, but rather as exemplifications of the preferred embodiments. Those skilled in the art will envision other possible variations of rules that are within its scope.

LIST OF ABBREVIATIONS

| | |
|---|---|
| DT | Determiner |
| NLP | Natural Language Processing |
| NP | Noun Phrase |
| OBJ | POS object |
| PC | Personal Computer |

-continued

| | |
|---|---|
| POS | Part Of Speech |
| PP | Pre-Position |
| Rule | NP repetition rule |
| SUBJ | POS subject |
| Subject | NP repetition subject |
| VP | Verb Phrase |

What is claimed is:

1. A method for information retrieval, performed by a computer processor (115), the method comprising the steps of:
   a. processing a corpus of sentences, wherein said processing comprises the steps of
      (i) providing a ranking criteria module (135), containing predefined ranking criteria, and coupled to operate with the computer processor;
      (ii) retrieving textual documents from a corpus of text documents (120), wherein said corpus is in operative communication flow with the computer processor;
      (iii) extracting prominent sentences from said textual documents, using said ranking criteria module; and
      (iv) updating a database of prominent sentences (130), coupled to operate with the computer processor; and
   b. retrieving prominent sentences from said database of prominent sentences, prioritized by said predefined ranking criteria and by user search keywords,
   wherein said extracting of prominent sentences comprises the step of scoring sentences according to at least one extracted rule; and
   wherein said extracted rule comprises the steps of:
      A. retrieving multiple sentences from said corpus of text documents, wherein for each of said retrieved sentences perform the following steps:
         1) identifying the structure of said retrieved sentence;
         2) identifying a verb pattern in said retrieved sentence, using said identified structure; and
         3) scoring said identified verb pattern, using said ranking criteria module:
      B. summing the score of each uniquely identified verb pattern over all the occurrences of said uniquely identified verb pattern in said corpus, to thereby generate aggregated scores for all of said uniquely identified verb patterns; and
      C. matching said aggregated scores of said uniquely identified verb patterns with a pre-defined threshold, to thereby generate prominence assigning rules.

2. The method of claim 1, wherein said step of scoring sentences is further performed according to parameters selected from the group including: sentence structure, frequency of NP subject, frequency of NP subject head, and a combination thereof.

3. The method of claim 2, wherein said sentence structure comprising from left to right, for left to right writing languages and from right to left for right to left writing languages: NP subject, verb pattern, text following said verb pattern, dot.

4. The method of claim 1, wherein said scoring of a verb pattern further includes the summing of the scores of at least one of the following parameters: number of occurrences of the NP subject in the same document both before and after the occurrence of the pattern, number of occurrences of the NP subject head of the subject in the same document both before and after the occurrence of the pattern, length in words of the NP subject, length in words of the verb cluster, length in words of the sentence, sentence tense, sentence aspect, sentence mood, sentence voice of the verbs in the pattern, subject is available in an existing library of concepts, NP subject head is available in an existing library of concepts, and a combination thereof.

5. The method of claim 1, wherein said verb pattern comprising from at least one of: verb cluster, the determination word of the object followed the verb cluster, punctuation, and a combination thereof.

6. The method of claim 1, wherein said retrieving of prominent sentences prioritized by said predefined ranking criteria comprising from at least one of: search keywords cited in document, document type, number of search keywords cited in a single prominent sentence, search keywords cited in the subject part of the prominent sentence, formal definition, number of words in subject, number of words in prominent sentence, the score of the prominent sentence, document creation date, frequency of interest in prominent sentence, morphological information, part of speech of a search keyword in prominent sentence, the ratio of all prominent sentences in document to the document length, document text quality, document size (in words) and a combination thereof.

7. The method of claim 1 further comprising the step of recommending online cross-interest prominent sentences, and wherein said recommending cross-interest prominent sentences comprises the steps of:
   a. indicating interest in prominent sentences by a user;
   b. updating the statistics of cross-interested prominent sentences in a cross-interested prominent sentences module, coupled to operate with the computer processor; and
   c. using the updated statistics of cross-interested prominent sentences to recommend at least one cross-interest prominent sentence to at least one user.

8. The method of claim 1, wherein said corpus of text comprises data components selected from the group including: any single document, any collection of documents, organizational project documents, organizational documents, any vertical corpus of text, corpora, and a combination thereof.

9. The method of claim 1, wherein said processing of a corpus of sentences is performed offline.

10. The method of claim 1, wherein said retrieving of prominent sentences, from said database of prominent sentences, is performed online.

11. A computer software product for searching and retrieving prominent sentences from textual documents, the computer software product embodied in a non-transitory computer-readable medium in which program instructions are stored, which instructions, wherein the program instructions, when read by a computer, perform a method for information retrieval comprising the steps of:
   a. providing a ranking criteria module, containing predefined ranking criteria, and coupled to operate with the computer processor;
   b. extracting prominent sentences from a textual document, using said ranking criteria module; and
   c. retrieving prominent sentences from a textual document, prioritized by said predefined ranking criteria, and by one or more user provided search keywords
   wherein said extracting of prominent sentences comprises the step of scoring sentences according to at least one extracted rule; and
   wherein said extracted rule comprises the steps of:
      A. retrieving multiple sentences from said corpus of text documents, wherein for each of said retrieved sentences perform the following steps:
         1) identifying the structure of said retrieved sentence;
         2) identifying a verb pattern in said retrieved sentence, using said identified structure; and 3) scoring said identified verb pattern, using said ranking criteria module;

B. summing the score of each uniquely identified verb pattern over all the occurrences of said uniquely identified verb pattern in said corpus, to thereby generate aggregated scores for all of said uniquely identified verb patterns; and C. matching said aggregated scores of said uniquely identified verb patterns with a pre-defined threshold, to thereby generate prominence assigning rules.

12. The computer software product of claim 11, wherein said step of scoring sentences is further performed according to parameters selected from the group including: sentence structure, frequency of NP subject, frequency of NP subject head, and a combination thereof.

13. The computer software product of claim 12, wherein said sentence structure comprises from left to right, for left to right writing languages and from right to left for right to left writing languages: NP subject, verb pattern, text following said verb pattern, dot.

14. The computer software product of claim 11 wherein said scoring of a verb pattern further includes the summing of the scores of at least one of the following parameters: number of occurrences of the NP subject of the same document both before and after the occurrence of the pattern, number of occurrences of the NP subject head of the subject in the same document both before and after the occurrence of the pattern, length in words of the NP subject, length in words of the verb cluster, length in words of the sentence, sentence tense, sentence aspect, sentence mood, sentence voice of the verbs in the pattern, subject is available in an existing library of concepts, NP subject head is available in an existing library of concepts, and a combination thereof.

15. The computer software product of claim 11 wherein said verb pattern comprising from at least one of: verb cluster, the determination word of the object followed the verb cluster, punctuation, and a combination thereof.

16. The computer software product of claim 11, wherein said retrieving of prominent sentences prioritized by said predefined ranking criteria comprising from at least one of: search keywords cited in document, document type, number of search keywords cited in a single prominent sentence, search keywords cited in the subject part of the prominent sentence, formal definition, number of words in subject, number of words in prominent sentence, the score of the prominent sentence, document creation date, frequency of interest in prominent sentence, morphological information, part of speech of a search keyword in prominent sentence, the ratio of all prominent sentences in document to the document length, document text quality, document size (in words) and a combination thereof.

17. The method of claim 11, wherein said processing of a corpus of sentences is performed offline, and wherein said retrieving of prominent sentences, from said database of prominent sentences, is performed online.

\* \* \* \* \*